United States Patent
Sheehan et al.

(10) Patent No.: US 9,856,592 B2
(45) Date of Patent: Jan. 2, 2018

(54) METHODS AND SYSTEMS FOR FORMING A FIBROUS PREFORM

(71) Applicant: Goodrich Corporation, Charlotte, NC (US)

(72) Inventors: Philip Sheehan, Pueblo West, CO (US); Modesto Martinez, III, Pueblo, CO (US); Sundararaman Vaidyaraman, Springboro, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/070,253

(22) Filed: Mar. 15, 2016

(65) Prior Publication Data

US 2017/0268141 A1    Sep. 21, 2017

(51) Int. Cl.
*D04H 18/02* (2012.01)
*D04H 1/46* (2012.01)
*D04H 1/4242* (2012.01)

(52) U.S. Cl.
CPC ............... *D04H 18/02* (2013.01); *D04H 1/46* (2013.01); *D04H 1/4242* (2013.01)

(58) Field of Classification Search
CPC .......... D04H 18/02; D04H 18/00; D04H 1/46; D04H 3/105; D04H 17/00; D04H 3/102; D04H 5/02; D04H 1/4242; F16D 2200/0052
USPC .............................. 28/115, 107, 109; 112/163
See application file for complete search history.

(56) References Cited

U.S. PATENT DOCUMENTS

| | | | | |
|---|---|---|---|---|
| 2,326,038 A * | 8/1943 | Kopriva | ................. | D04H 18/00 28/115 |
| 2,873,507 A * | 2/1959 | Kelson | ................... | D04H 18/02 28/115 |
| 3,428,506 A * | 2/1969 | Johnstone | ............. | B01D 39/04 156/148 |
| 3,605,223 A * | 9/1971 | Barth | ..................... | D04H 18/02 28/115 |
| 4,035,881 A * | 7/1977 | Zocher | ................... | D04H 11/08 28/111 |
| 4,342,802 A * | 8/1982 | Pickens, Jr. | .............. | B32B 5/06 156/72 |
| 4,390,582 A * | 6/1983 | Pickens, Jr. | ............ | D04H 11/08 156/72 |
| 4,935,295 A * | 6/1990 | Serafini | .................... | D04H 3/10 156/148 |
| 5,018,255 A * | 5/1991 | Bolliand | ................. | B29C 70/24 28/107 |
| 5,664,305 A | 9/1997 | Lawton et al. | | |
| 5,869,411 A | 2/1999 | Bazshushtari et al. | | |
| 5,908,792 A | 6/1999 | Sheehan et al. | | |
| 6,065,194 A * | 5/2000 | Dilo | ....................... | D04H 18/02 28/107 |
| 6,174,594 B1 | 1/2001 | Smith et al. | | |
| 6,248,417 B1 | 6/2001 | Ponsolle et al. | | |
| 6,360,412 B1 | 3/2002 | Duval et al. | | |

(Continued)

FOREIGN PATENT DOCUMENTS

GB            1327993 A  *  8/1973

*Primary Examiner* — Amy Vanatta
(74) *Attorney, Agent, or Firm* — Snell & Wilmer, L.L.P.

(57) ABSTRACT

Systems and methods for forming a fibrous preform are disclosed. The method may comprise providing a plurality of needles comprising a barbed needle and a barbless needle and penetrating the fibrous preform with the plurality of needles.

17 Claims, 8 Drawing Sheets

(56) References Cited

U.S. PATENT DOCUMENTS

| | | |
|---|---|---|
| 6,405,417 B1 | 6/2002 | Sheehan et al. |
| 8,074,330 B2 | 12/2011 | Lescostaouec |
| 8,214,981 B2 | 7/2012 | Hethcock et al. |
| 8,216,641 B2 | 7/2012 | Bouchard et al. |

* cited by examiner

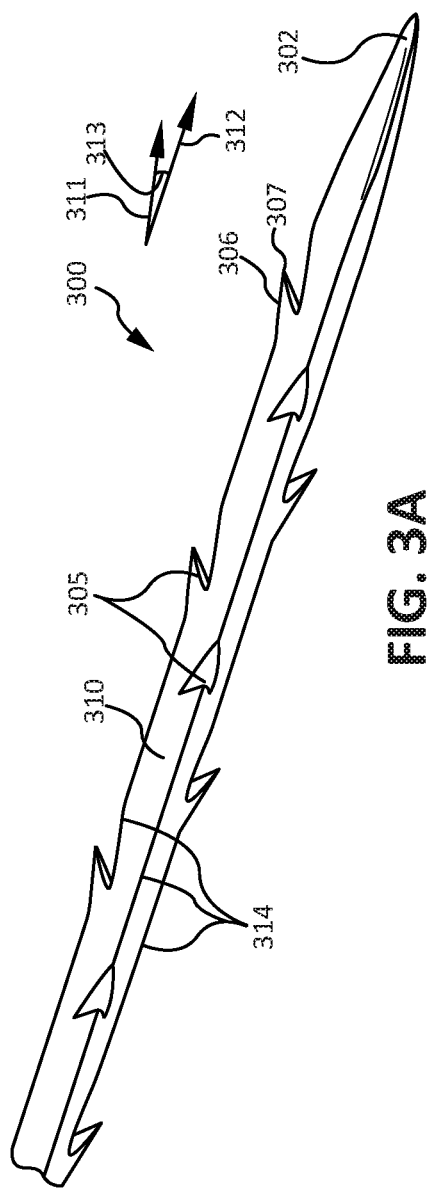
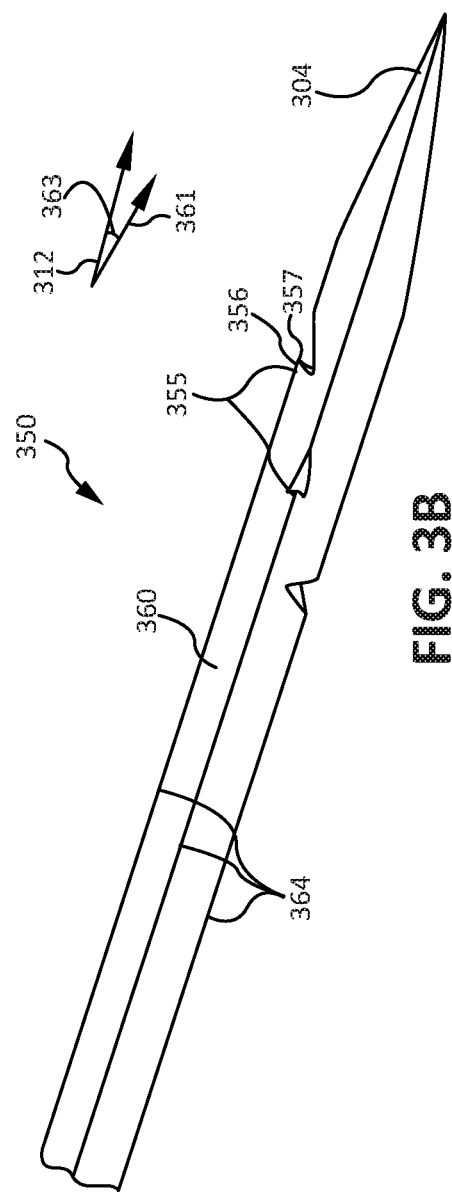

METHODS AND SYSTEMS FOR FORMING A FIBROUS PREFORM

FIELD

The present disclosure relates generally to the manufacture of composite materials and parts. More particularly, the disclosure relates to methods and systems for forming fibrous preforms.

BACKGROUND

Carbon/carbon ("C/C") parts are employed in various industries. An exemplary use for C/C parts includes using C/C parts as friction disks such as aircraft brake disks, race car brake disks, clutch disks, and the like. Conventionally, C/C aircraft brakes are manufactured from preforms that have been cut or die punched from a long board of uniformly needled oxidized polyacrylonitrile (PAN) fibers ("OPF") material. Each horizontal layer of the preform is typically laid down and needled continuously across the majority of each surface of the preform. Needling is typically followed by carbonization and densification. Needling of OPF or carbon fiber material may affect certain performance characteristics of C/C parts, including densification, mechanical strength, heat conduction, and friction and wear characteristics.

SUMMARY

According to various embodiments, systems and methods for forming a fibrous preform is provided. In various embodiments, the method may comprise providing a plurality of needles comprising a barbed needle and a barbless needle and penetrating the fibrous preform with the plurality of needles. In various embodiments, penetrating the fibrous preform with the plurality of needles may comprise penetrating with the barbed needle having a high angle barb and/or a high barb density. In various embodiments, penetrating the fibrous preform with the plurality of needles may comprise penetrating with the barbed needle having three barbed edges. Penetrating the fibrous preform with the plurality of needles may comprise penetrating with the barbed needle having three barbs on each of the three barbed edges. The three barbs on each of the three barbed edges may be high angle barbs.

In various embodiments, penetrating the fibrous preform with the plurality of needles may comprise penetrating with the barbless needle having a needle tip, the needle tip comprising a tamp surface. Penetrating the fibrous preform with the plurality of needles may comprise penetrating with the barbless needle having a barbless needle length that is shorter than a barbed needle length.

In various embodiments, penetrating the fibrous preform with the plurality of needles may comprise penetrating with the barbed needle having a low angle barb and/or a low barb density. In various embodiments, penetrating the fibrous preform with the plurality of needles may comprise penetrating with the barbed needle having four barbed sides. The barbed needle may comprise a low angle barb on each of the four barbed sides.

In various embodiments, penetrating the fibrous preform with the plurality of needles may comprise penetrating with approximately 50% of a plurality of the barbed needle and approximately 50% of a plurality of the barbless needle. In various embodiments, the approximately 50% of the plurality of the barbed needle may comprise a first approximately 50% of each barbed needle having a high barb density and a second approximately 50% of each barbed needle having a low barb density. In various embodiments, the approximately 50% of the plurality of the barbed needle may comprise a first approximately 50% of each barbed needle having a high angle barb and a second approximately 50% of each barbed needle having a low angle barb.

In various embodiments, a fibrous preform needling system for a fibrous preform having a fibrous layer may comprise a needling board, and a plurality of needles coupled to the needling board, the plurality of needles comprising a barbed needle and a barbless needle. In various embodiments, the barbless needle comprises a tamp surface. In various embodiments, the plurality of needles may comprise approximately 50% of a plurality of the barbed needle and approximately 50% of a plurality of the barbless needle. In various embodiments, the approximately 50% of the plurality of the barbed needle may comprise a first approximately 50% of each barbed needle having a high barb density and a second approximately 50% of each barbed needle having a low barb density. In various embodiments, the barbless needle may have a barbless needle length that is shorter than a barbed needle length.

In various embodiments, a method for forming a fibrous preform may comprise coupling a plurality of barbed needles to a needling board, coupling a plurality of barbless needles to the needling board, wherein a location of the barbless needles alternate axially and laterally with locations of the barbed needles, and applying the needling board to the fibrous preform, the fibrous preform comprising a fibrous layer. In various embodiments, applying the needling board may comprise applying with the needling board coupled with approximately 50% of the barbed needles and approximately 50% of the barbless needles.

BRIEF DESCRIPTION OF DRAWINGS

The present disclosure may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified.

FIGS. 3A and 3B illustrate barbed needles, in accordance with various embodiments;

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, systems and methods may find particular use in connection with aircraft brake disks. However, various aspects of the disclosed embodiments may be adapted for optimized performance with a variety of carbon fiber preforms and C/C brake disks. As such, numerous applications of the present disclosure may be realized.

Carbon/carbon ("C/C") parts in the form of friction disks are commonly used for aircraft brake disks and race car brake and clutch disks. Carbon/carbon brake disks are especially useful in these applications because of the superior high temperature characteristics of C/C material. In particular, the carbon/carbon material used in C/C parts is a good conductor of heat and is able to dissipate heat generated during braking away from the braking surfaces. Carbon/carbon material is also highly resistant to heat damage, and thus, is capable of sustaining friction between brake surfaces during severe braking without a significant reduction in the friction coefficient or mechanical failure.

Figure 1:
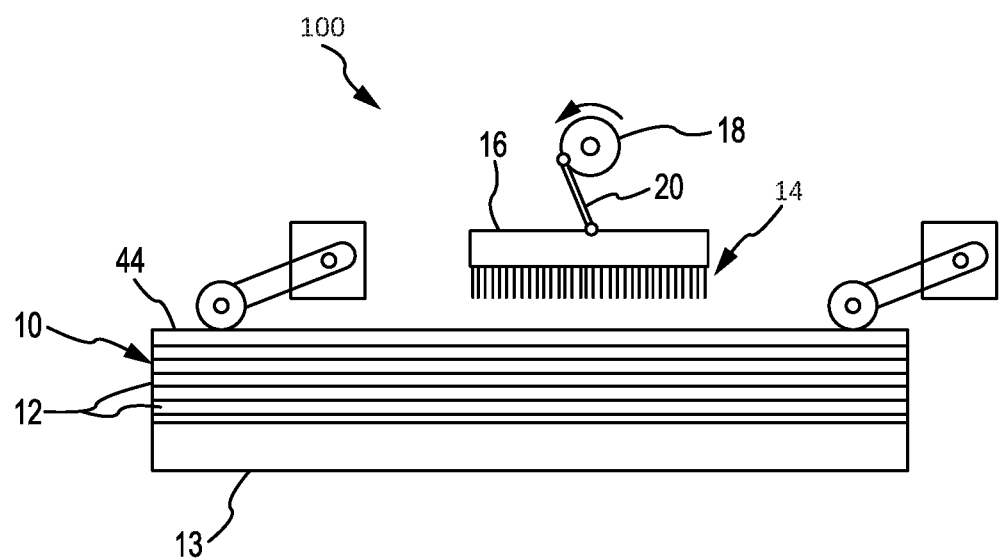
FIG. 1 illustrates a needling apparatus, in accordance with various embodiments.
Figure 2:
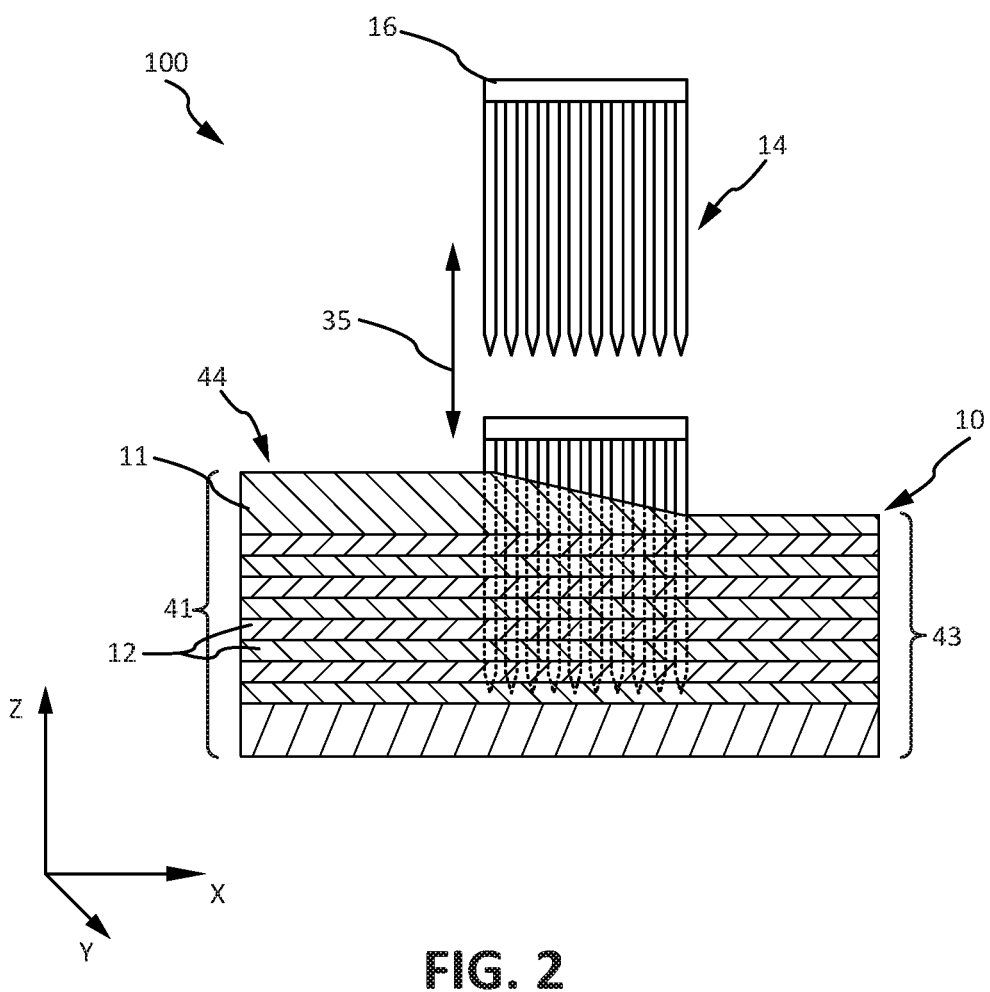
FIG. 2 illustrates a schematic side view of a fibrous preform and needles, in accordance with various embodiments.

Referring to FIGS. 1 and 2, a fibrous preform needling system 100 is shown that may be used to form a fibrous preform 10 is depicted, in accordance with various embodiments. Fibrous preform 10 may comprise at least one fibrous layer 12. In various embodiments, fibrous preform 10 may be formed by superimposing a number of fibrous layers 12 on top of each other. Fibrous layers 12 may be made from OPF, though in various embodiments fibrous layers 12 may comprise one or more of PAN or carbon fiber. Fibrous layers 12 may be made in a variety of ways and may include discrete (staple) or continuous fibers, unidirectional or cross-layered fibers or braided structures. In that regard, fibrous layers 12 comprise one or more fibers. Fibrous layers 12 may also be preprocessed in various ways, such as pre-needling processes, to make the fibrous layers more coherent.

Fibrous layers 12 are placed on top of each other one-by-one. After each fibrous layer 12 is placed on top of the stack 44 of fibrous layers 12, the stack 44 is needled with a needling board 16. Numerous types of needling techniques are possible. However, as shown, a needling system may include a needling board 16 that moves up and down along axis 35 in a reciprocating manner. A drive mechanism 18, such as a rotating wheel, and an off-center connecting rod 20 may be used to accomplish the desired reciprocating motion. A plurality of needles 14, which may comprise one or more of barbed needles and/or barbless needles, face stack 44 of fibrous layers 12 and penetrate fibrous layers 12 as needling board 16 strokes downward (along axis 35). As a result, fibrous layers 12 may be compressed together from the force applied on fibrous layers 12 by needling board 16 and/or needles 14. In embodiments having at least one barbed needle, the barbs of the barbed needle or needles of needles 14 move fibers from one fibrous layer 12 to another fibrous layer 12 to form z-fibers that extend along the z-axis (depicted in FIG. 2) across the fibrous layers 12. Needling with barbed needles pulls fibers from the in-plane direction (as shown, a plane parallel to the x-y plane) and forces them into the z-direction to form z-fibers, thus decreasing in-plane fiber content, which may reduce high-energy friction performance and in-plane mechanical strength in the final composite. Such needling with barbed needles that creates z-fibers may be referred to as "z-needling."

In general, the needling process has the effect of compressing and interlocking the individual fibrous layers 12 together. Thus, after needling, fibrous preform 10 has fibers extending in three different directions (i.e., in the x and y directions in the plane of the fibrous layers 12 and the z direction perpendicular to the fibrous layers 12). The entire surface of stack 44 of fibrous layers 12 may be needled by moving support 13 back-and-forth or the needling board 16 may be repositioned along the surface of stack 44. In various embodiments, needles 14 may only penetrate a portion of fibrous layers 12 with each down stroke without penetrating through the entire stack 44 of fibrous layers 12, or needles 14 may penetrate the entire stack 44.

C/C parts have improved wear properties (for braking, for example) when the fiber volume is increased within fibrous preform 10, which is a precursor to a C/C part. Fiber volume may be increased by increasing the level of compression applied to stack 44 and z-needling stack 44, as described herein. The z-needling holds fibrous layers 12 together, maintaining the compression achieved during the needling process. However, the barbed needles creating the z-fibers rupture and break up the fibers within the fibrous preform, which results in decreased friction performance. Therefore, less z-needling would be beneficial while still maintaining the compression of stack 44

As described herein, and in reference to FIG. 2, needles 14 with needling board 16 provide a compression force against stack 44 of fibrous layers 12. This compression force may cause fibrous layers 12 to become more compact, and cause stack 44 to shorten from height 41 to compressed height 43. The compression force may affect only a newly-added fibrous layer 11 as shown in FIG. 2, or it may compress the entire stack 44. As stack 44 is compressed by needles 14, barbed needles may create z-fibers and stitch stack 44 together, thereby causing stack 44 to maintain the compressed height 43.

As described herein, the systems and/or methods for needling a fibrous preform 10 during fibrous preform formation may be employed in any system and/or method for forming a fibrous preform. Additionally, in various embodiments, a single fibrous layer 12 and/or multiple fibrous layers 12 may be needled using the methods and/or systems of this disclosure. In various embodiments, needles 14 may be arranged on needling board 16 in any suitable manner. For example, needles 14 may be in parallel or staggered rows. In various embodiments, needling board 16 may comprise various types of needles 14, such as barbless needles and barbed needles.

With reference to FIGS. 3A and 3B, in various embodiments, barbed needles may comprise barbs that may be characterized as either high angle barbs or low angle barbs. Barbed needle 300 is an example of a barbed needle comprising high angle barbs 305. Barbed needle 300 may be referred to as the "GB9 barbed needle" which may comprise nine high angle barbs on three barbed edges, i.e., three high angle barbs on each edge. A high angle barb 305 may be a barb that comprises a high angle barb ramp 306, which is the outer edge of high angle barb 305 leading up to a barb point 307, pointing in a direction 311 that creates a positive angle 313 (i.e., an angle that is greater than zero degrees) between direction 311 and a needle body direction 312, where needle body direction 312 is zero degrees. As depicted in FIG. 3A, high angle barb ramp 306 creates a positive angle 313 with needle body direction 312, indicating that high angle barb ramp 306 is a high angle barb in high angle barbs 305.

Barbed needle 350 is an example of a barbed needle comprising low angle barbs 355. Barbed needle 350 may be referred to as the "F4 barbed needle" which may comprise four low angle barbs on four barbed edge, i.e., one low angle barb on each edge. A low angle barb 355 may be a barb that comprises a low angle barb ramp 356, which is the outer edge of low angle barb 355 leading up to a barb tip 357, pointing in a direction 361 that creates an angle 363 that is less than or equal to zero degrees between direction 361 and needle body direction 312, where needle body direction 312 is zero degrees. As depicted in FIG. 3B, low angle barb ramp 356 creates a zero-degree angle with needle body direction 312, indicating that low angle barb ramp 356 is a low angle barb in low angle barbs 355.

In various embodiments, barbed needles may comprise a needle body 310 and/or needle body 360, which may comprise any suitable shape and/or number of sides and/or edges, and any suitable number of the edges may be barbed edges. Barbed needles may have concave or convex sides or comprise a cylindrical shape, in which case the barbs would be disposed on the sides or on the cylindrical body, respectively. Furthermore, barbed edges or sides may comprise any suitable number of barbs per barbed edge or side. In various embodiments, a needle and/or a barbed edge or side may comprise barbs of different configurations (i.e., high angle barbs and/or low angle barbs). Additionally, needle body 310 and/or 360 may comprise any suitable length and/or cross-sectional area.

In various embodiments, a barbed needle, such as barbed needle 300, may comprise three sides, three barbed edges 314, and/or a point 302. Barbed edges 314 may comprise three high angle barbs 305 each. In various embodiments, a barbed needle, such as barbed needle 350 may comprise four sides, four barbed edges 364 (three barbed edges 364 depicted), and/or a point 304. Barbed edges 364 may comprise one low angle barb 355 each.

Relating to the number of barbs on a barbed needle 300, 350, in various embodiments, each barbed needle 300, 350 may comprise a barb density. Barb density may be defined as the number of barbs per needle. As depicted in FIG. 3A, barbed needle 300 has a barb density of 9. As depicted in FIG. 3B, barbed needle 350 has a barb density of 4. A needle with high barb density may indicate a needle comprising five or more barbs (i.e., barb density of 5 or more). A needle with low barb density may indicate a needle comprising fewer than five barbs (i.e., barb density of 4 or fewer).

Figure 4A:
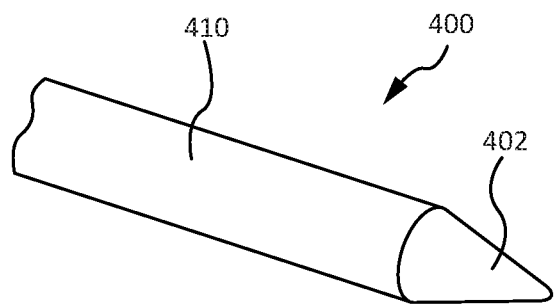
FIGS. 4A and 4B illustrate barbless needles, in accordance with various embodiments.
Figure 4B:
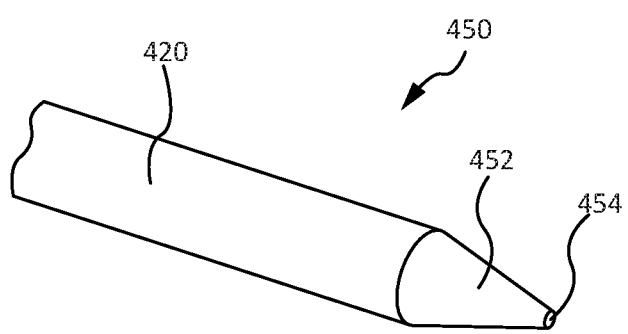

With reference to FIGS. 2, 4A, and 4B, in various embodiments, needles 14 in needling board 16 may comprise barbless needles, such as barbless needles 400 and 450. Barbless needle 400 may comprise a needle body 410 and a point 402. Barbless needle 450 may comprise needle body 410, needle tip 452, and/or tamp surface 454. Needle tip 452 may taper from needle body 410 to tamp surface 454. Tamp surface 454 may be a substantially flat surface at the end of needle tip 452. In various embodiments, barbless needle 450 may not comprise a needle tip 452 tapered from needle body 420 to tamp surface 454, and may only comprise tamp surface 454, which that may be the size of the cross-sectional area of the needle body 420. Needle body 410, 420 may comprise any suitable shape, such as a cylindrical shape as shown in FIGS. 4A, B, or for example, the shapes of barbed needles 300 and/or 350 (depicted in FIGS. 3A, B), without barbs 305, 355, respectively. Additionally, needle body 410, 420 may comprise any suitable length and/or cross-sectional area.

Figure 5A:
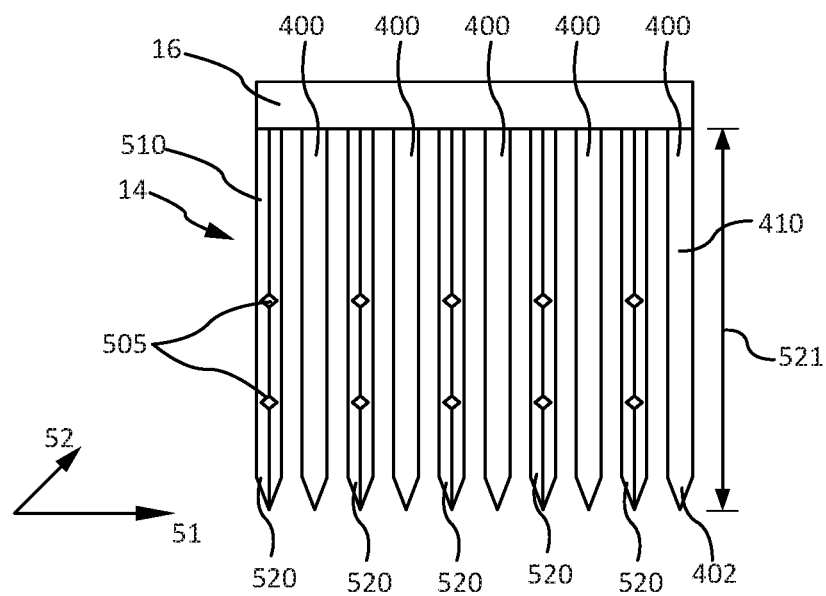
FIGS. 5A and 5B illustrate needling boards with barbed needles and barbless needles, in accordance with various embodiments.
Figure 5B:
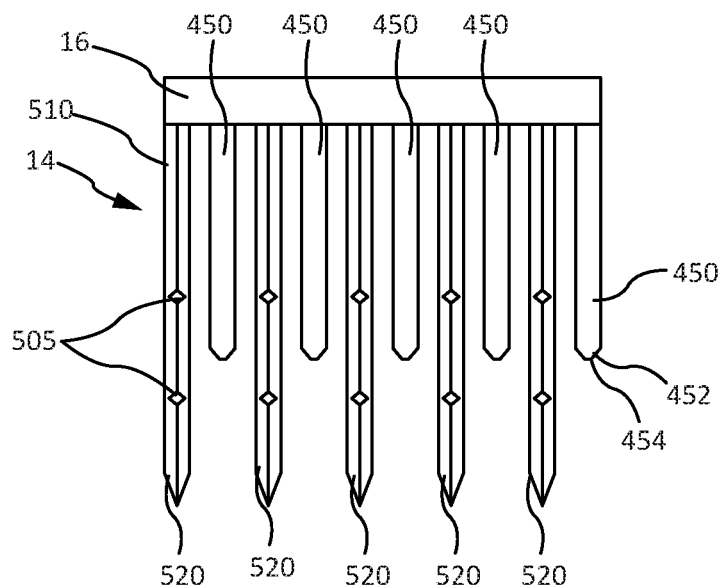

Needling board 16 and needles 14 are used generically throughout the description of the exemplary embodiments. It can be appreciated that numerous sizes, shapes, and types of needling boards and/or needles can be combined within the scope of this disclosure such as described with reference to the exemplary embodiments. Referring to FIGS. 5A and 5B, in various embodiments, needling board 16 may comprise one or more barbed needles 520 and/or one or more barbless needles 400, 450. Barbed needles 520 may comprise needle bodies 510 of any shape, any number of sides and/or edges, any number of barbs 505 on the edges (or on a side or surface, such as the surface of a cylindrical needle body), and/or any barb density. Likewise, barbless needles 400 may comprise needle bodies 410 of any suitable shape. Referring to FIG. 5A, barbless needles 400 may comprise needle points 402. Referring to FIG. 5B, barbless needles 450 may comprise needle tips 452 and/or tamp surfaces 454. A needle length 521 may be measured from where the needle 14 couples to needling board 16 to point 402, or a tamp surface (such as tamp surface 454). In various embodiments, all needles 14 on needling board 16 may have the same needle length 521. In various embodiments, some needles may be shorter than others. In various embodiments, as depicted in FIG. 5B, barbless needles 450 may have a shorter needle length than barbed needles 520. In various embodiments, barbless needles 400 may have a shorter needle length than barbed needles 520. In various embodiments, barbed needles 520 may have a shorter needle length than the barbless needles on needling board 16. In various embodiments, needles 14 may vary in width, shape, length, or any other parameter from other needles 14 to any degree.

In various embodiments, the barbed needles on a needling board may be disposed in any suitable arrangement relative to the barbless needles. In various embodiments, with further reference to FIG. 5A as an example, the locations of barbed needles 520 may alternate axially along axis 51 with barbless needles 400. In various embodiments, barbed needles 520 may alternate laterally along axis 52 with barbless needles 400.

In various embodiments, needling board 16 may comprise any suitable combination of barbed needles and barbless needles. In various embodiments, needling board 16 may comprise 20% to 50% barbed needles, with the remaining needles 14 comprising barbless needles. In various embodiments needling board 16 may comprise 50% to 80% barbed needles, with the remaining needles 14 comprising barbless needles. In various embodiments, needling board 16 may comprise approximately 50% barbed needles and approximately 50% barbless needles. In various embodiments, needling board 16 may comprise approximately 75% barbed needles and approximately 25% barbless needles. In various embodiments, needling board 16 may comprise approximately 25% barbed needles and approximately 75% barbless needles. In various embodiments, needling board 16 may comprise approximately 80% barbed needles and approximately 20% barbless needles. In various embodiments, needling board 16 may comprise approximately 20% barbed needles and approximately 80% barbless needles. In various embodiments, needling board 16 may comprise approximately 60% barbed needles and approximately 40% barbless needles. In various embodiments, needling board 16 may comprise approximately 40% barbed needles and approximately 60% barbless needles. As used in this context only, "approximately" refers to plus or minus 10% of needles 14 in needling board 16.

In various embodiments, any percentage of the barbed needles in needling board 16 may comprise one or more high angle barbs and/or one or more low angle barbs. In various embodiments, any percentage of the barbed needles in needling board 16 may comprise any barb density. In various embodiments, between 0% and 50% of the barbed needles in needling board 16 may comprise at least one high angle barb and/or may comprise a high barb density. In various embodiments, between 0% and 50% of the barbed needles in needling board 16 may comprise at least one low angle barb and/or may comprise a low barb density. In various embodiments, the percentage of barbed needles in needling board 16 may comprise approximately 50% barbed needles comprising at least one high angle barb and/or a high barb density, and approximately 50% barbed needles comprising at least one low angle barb and/or a low barb density. In various embodiments, the percentage of barbed needles in needling board 16 may comprise approximately 50% barbed needles comprising at least one high angle barb and a barb density of nine, and approximately 50% barbed needles comprising at least one low angle barb and a barb density of 4. In various embodiments, the percentage of barbed needles in needling board 16 may comprise approximately 50% barbed needles comprising 9 high angle barbs and/or a barb density of nine, and approximately 50% barbed needles comprising 4 low angle barbs and/or a barb density of 4. In various embodiments, the percentage of barbed needles in needling board 16 may comprise approximately 25% barbed needles comprising at least one high angle barb and/or a high barb density, and approximately 75% barbed needles comprising at least one low angle barb and/or a low barb density. In various embodiments, the percentage of barbed needles in needling board 16 may comprise approximately 75% barbed needles comprising at least one high angle barb and/or a high barb density, and approximately 25% barbed needles comprising at least one low angle barb and/or a low barb density. In various embodiments, the percentage of barbed needles in needling board 16 may comprise approximately 90% barbed needles comprising at least one high angle barb and/or a high barb density, and approximately 10% barbed needles comprising at least one low angle barb and/or a low barb density. In various embodiments, the percentage of barbed needles in needling board 16 may comprise approximately 10% barbed needles comprising at least one high angle barb and/or a high barb density, and approximately 90% barbed needles comprising at least one low angle barb and/or a low barb density. As used in this context only, "approximately" refers to plus or minus 10% of the barbed needles.

In various embodiments, the percentage of barbed needles in needling board 16 may comprise 100% barbed needles comprising at least one low angle barb and/or a low barb density. In various embodiments, the percentage of barbed needles in needling board 16 may comprise 100% barbed needles comprising 4 low angle barbs and/or a barb density of 4. In various embodiments, the percentage of barbed needles in needling board 16 may comprise 100% barbed needles comprising at least one high angle barb and/or a high barb density. In various embodiments, the percentage of barbed needles in needling board 16 may comprise 100% barbed needles comprising 9 high angle barbs and/or a barb density of 9.

Barbless needles provide compression during the needling process but to a lesser extent than barbed needles. However, barbless needles do not form z-fibers, and therefore, do not disrupt the carbon fibers and negatively affect the friction performance and mechanical strength of the fibrous preform. By having a percentage of needles 14 in needling board 16 be barbless needles, a small amount of compression may be sacrificed in order to decrease the amount of z-needling. Decreasing the z-needling means improving on friction performance and mechanical strength of fibrous preform 10. Compression levels during needling with a percentage of barbless needles may be increased by using barbless needles comprising a tamp surface, such as tamp surface 454. Tamp surface barbless needles may comprise a shorter length than other barbed and/or barbless needles without tamp surfaces.

Figure 6A:
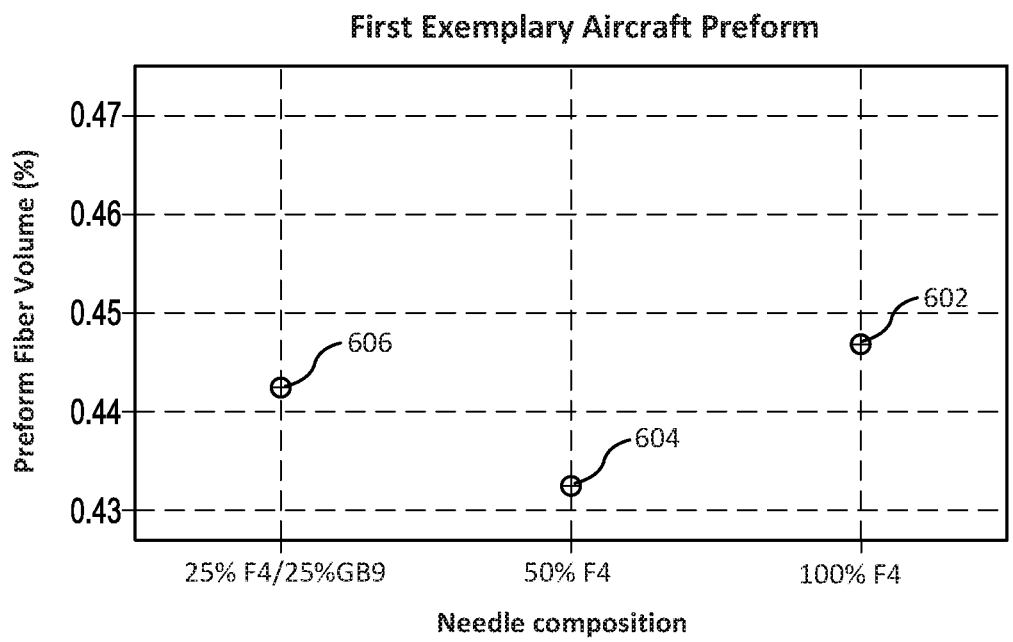
FIGS. 6A-6D illustrate preform fiber volume and ultra wave velocity data for various fibrous preforms and needle combinations, in accordance with various embodiments.

In accordance with various embodiments, FIGS. 6A-D depict preform fiber volume and ultra wave velocity data for various preforms and needling methods. FIG. 6A depicts a plot showing preform fiber volume for a preform designed for a first exemplary aircraft using various needle combinations. Along the x-axis are different combinations of needles used in the needling process. In FIGS. 6A-6D, any unaccounted for percentage along the x-axis is to be understood as being filled with barbless needles. Along the y-axis is the preform fiber volume (%), which is volume of the fibers over the total volume of the preform; the total volume of the preform may comprise the volume of fibers plus the volume of air between the fibers and within the pores in the preform. The preform fiber volume is the result of the amount of compression on the fibrous layers. Data point 602 shows the preform fiber volume for a preform needled with 100% F4 barbed needles (the baseline), which is 45% preform fiber volume. Data point 602, the baseline, reflects the desired amount of compression on the fibrous preform with 100% F4 barbed needles. Data point 604 shows the preform fiber volume for a preform needled with 50% F4 barbed needles and 50% barbless needles, which is 43% preform fiber volume. Finally, data point 606 shows the preform fiber volume for a preform needled with 25% F4 barbed needles, 25% GB9 barbed needles, and 50% barbless needles, which is 44% preform fiber volume. The barbless needles used in the trials for FIGS. 6A-D comprise needles shaped the same as the F4 barbed needles, but without the barbs.

FIG. 6A shows that a similar level of compression of the fibrous preform may be achieved when replacing a percentage of barbed needles with barbless needles. Therefore, with barbless needles in combination with barbed needles used in needling, preform fiber volumes may be maintained near the baseline level (data point 602). The type of barbed needles may be varied to achieve better compression. For example, as shown by data point 606, by using some GB9 barbed needles, which have a higher barb density than the F4 barbed needles and create more z-fibers than F4 barbed needles, better compression (higher fiber volume) was achieved than data point 604 because the high angle barbs and higher barb density of the GB9 barbed needle better compress the fibrous layers. It should be understood that any percentage of the needles on a needling board may be barbed or barbless, and any percentage of the barbed needles may be more or less aggressive barbed needles.

Figure 6B:
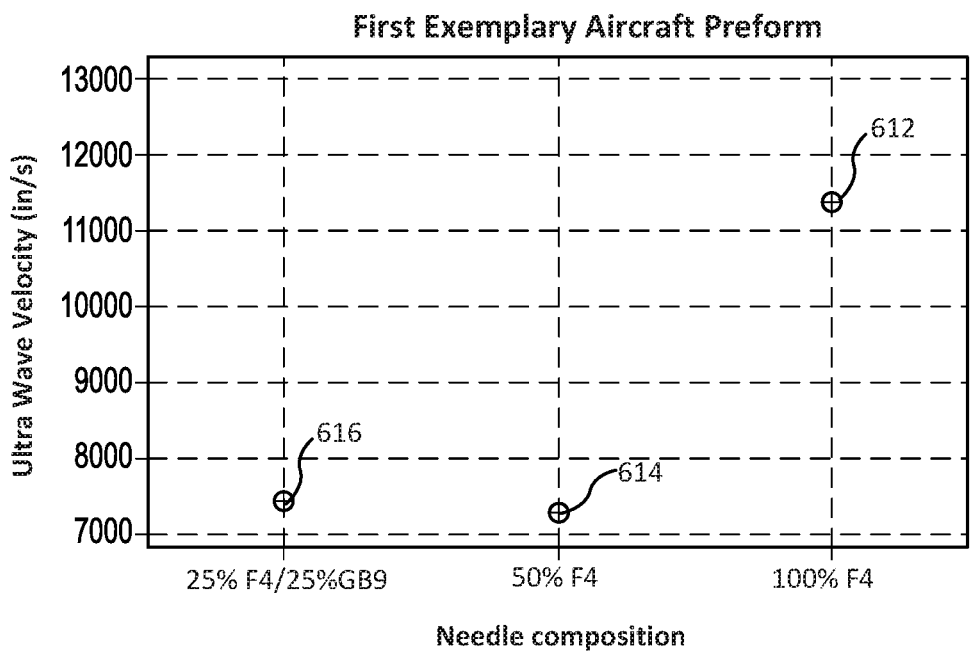
Figure 6C:
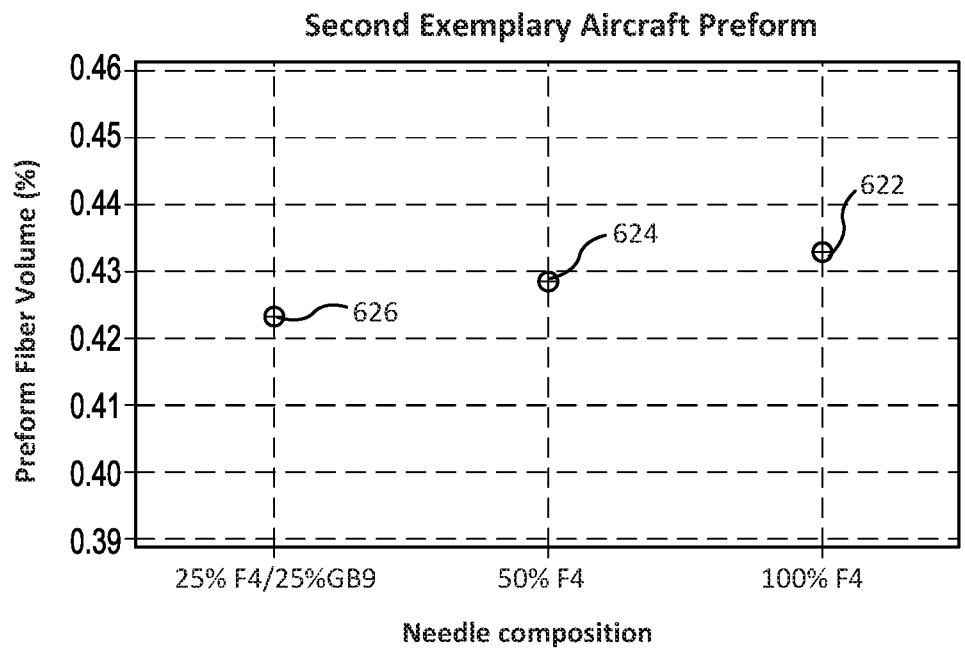

FIG. 6C reflects similar results as FIG. 6A, but for a fibrous preform designed for a second exemplary aircraft. FIG. 6C has the same axes as FIG. 6A, and data points 622, 624, and 626 comprise the same needle make-ups as data points 602, 604, and 606 in FIG. 6A, respectively. Data point 622 reflects a baseline of 43.3% preform fiber volume, data point 624 reflects a 42.9% preform fiber volume, and data point 626 reflects a 42.3% preform fiber volume. Similar to the findings from FIG. 6A, FIG. 6C also shows that a relatively small amount of preform fiber volume is lost by adding barbless needles to the needling process.

Figure 6D:
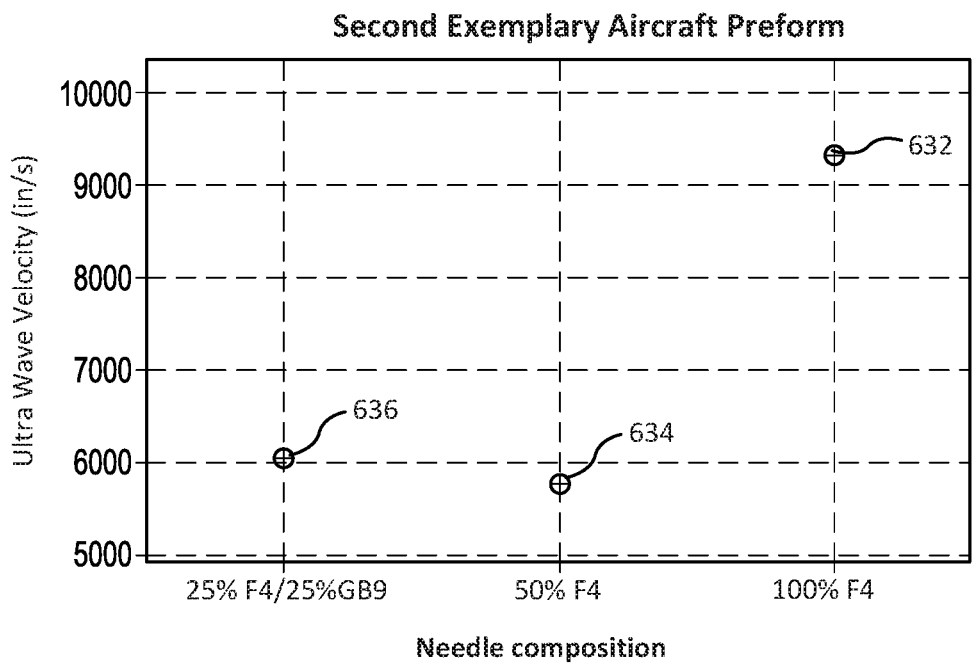

FIGS. 6B and 6D depict plots for measuring the amount of z-fibers present in the fibrous preform after needling. Along the x-axis are different combinations of needles used in the needling process. Along the y-axis is ultra wave velocity (UWV) (in/s). A UWV measurement is conducted by applying ultrasonic waves to the fibrous preform. Ultra wave velocity depends on the fiber matrix within the fibrous preform, and z-fibers help propagate the ultrasonic waves through the fibrous preform. Accordingly, the higher the UWV, the more z-fibers are present in the fibrous preform. Therefore, low UWV values are desired, indicating fewer z-fibers, and yielding better friction performance and mechanical strength.

Data points 612 and 632 involve a preform needled with 100% F4 barbed needles (the baseline), data points 614 and 634 involve a preform needled with 50% F4 barbed needles and 50% barbless needles, and data points 616 and 636 involve a preform needled with 25% F4 barbed needles, 25% GB9 barbed needles, and 50% barbless needles.

FIG. 6B depicts data from a fibrous preform designed for a first exemplary aircraft. Data point 612 gave a baseline value of 11379 in/s, data point 614 gave a value of 7283 in/s, and data point 616 gave a value of 7429 in/s.

FIG. 6D depicts data from a fibrous preform designed for a second exemplary aircraft. Data point 632 gave a baseline value of 9343 in/s, data point 634 gave a value of 5763 in/s, and data point 636 gave a value of 6038 in/s.

FIGS. 6B and 6D show that with the addition of barbless needles to the needling process, the amount of z-fibers greatly decreases as evidenced by the smaller UWV values in data points 614, 616, 634, and 636 with 50% barbless needles as compared to data points 612 and 632 reflecting much larger baseline values with 100% F4 barbed needles. The use of 25% more-aggressive GB9 barbed needles and 25% F4 barbed needles did not significantly increase the z-fiber amount from 50% F4 barbed needles. Therefore, the addition of the barbless needles greatly reduces the amount of z-fibers in a fibrous preform, and therefore, improves friction performance and mechanical strength.

FIGS. 6A-6D show that the inclusion of barbless needles in the needling process sacrifices a small percentage of preform fiber volume while greatly decreasing z-fiber, and therefore increasing friction performance and mechanical strength of the preform. For example, as depicted in FIGS. 6A and 6B, referring to data points 602, 604, 612, and 614, a 9% decrease in preform fiber volume (between data points 602 and 604), approximately, may achieve approximately a 36% decrease in UWV (corresponding to a 36% decrease in z-fibers) between data points 612 and 614. As used in this context only, "approximately" refers to plus or minus 2% change in preform fiber volume, and 2% change in UWV, respectively. To achieve specific desired fiber volumes and/or z-fiber amounts, the needle composition may be varied as discussed herein.

Figure 7:
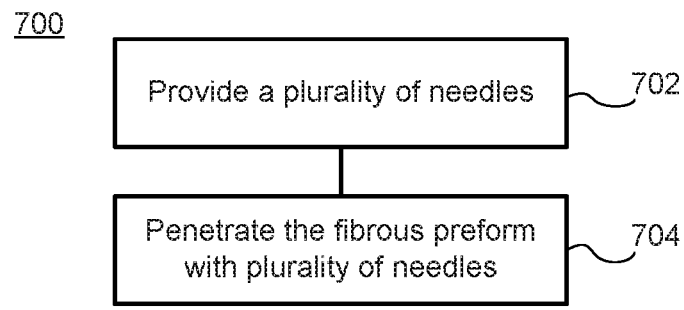
FIG. 7 illustrates a method of forming a fibrous preform, in accordance with various embodiments.

FIG. 7 depicts a method 700 of forming a fibrous preform, in accordance with various embodiments. With combined reference to FIGS. 1, 2, and 7, in various embodiments, a plurality of needles may be provided (step 702) and fibrous preform 10 may be penetrated by the plurality of needles 14 on a needling board 16 (step 704). Fibrous preform 10 may comprise one or more fibrous layers 12. The plurality of needles 14 may comprise at least one barbed needle and at least one barbless needle. Needling board 16 may comprise any combination and/or arrangement of needles 14 as described herein (i.e., any combination of barbed needles and barbed needles, any type of barbed needles and/or any combination of different types of barbed needles, needles 14 may take any shape or have any length, etc.). The barbless needles may comprise tamp surface 454. Fibrous layers 12 may be compressed as a result of being penetrated by needles 14. Z-fibers may be created between fibrous layers 12 by the barbed needles on needling board 16.

Figure 8:
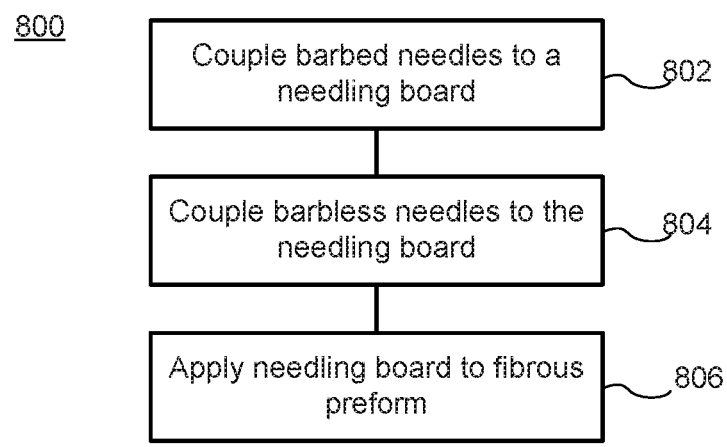
FIG. 8 illustrates a method of forming a fibrous preform, in accordance with various embodiments.

FIG. 8 depicts a method 800 of forming a fibrous preform, in accordance with various embodiments. With combined reference to FIGS. 1, 2, and 8, in various embodiments, barbed needles may be coupled to needling board 16 (step 802). Barbed needles may be any type of barbed needles and/or any combination of different types of barbed needles, as described herein. Barbless needles may be coupled to needling board 16 (step 804). Needling board 16 may comprise any combination and/or arrangement of needles 14 as described herein (i.e., any combination of barbed needles and barbless needles, any type of barbed needles and/or any combination of different types of barbed needles, needles 14 may take any shape or have any length, etc.). The barbless needles may comprise tamp surface 454. Needling board 16 may be applied to fibrous preform 10 (step 806) such that needles 14 penetrate the one or more fibrous layers 12 comprised in fibrous preform 10. Stack 44 may be compressed by the barbed needles and/or the barbless needles. Z-fibers may be created within stack 44 between fibrous layers 12 by the barbed needles.

In various embodiments, the needling systems and methods described herein during fibrous preform formation may be applied at any stage of forming a fibrous preform without going outside the scope of this disclosure. For example, a fibrous preform 10 may be needled using the systems and methods described herein before or after fibrous preform 10 is charged.

In various embodiments, once the fibrous preform achieves a desired thickness and the needling process is complete, fibrous preform 10 is sculpted by a cutting device to shape the final preform into an annular shape to form a fibrous annular preform. In further embodiments, fibrous preform 10 is sculpted by a cutting device to shape the final preform into a circular shape. In still further embodiments, the fibrous preform may be sculpted into any shape as required for the use of the preform.

After fibrous preform 10 is made and shaped, and in embodiments in which fibrous preform 10 comprises OPF, it may be carbonized to convert the OPF into carbon fibers. Typically, fibrous preforms 10 are carbonized by placing fibrous preforms 10 in a furnace with an inert atmosphere for a portion of the carbonization. Typically, a vacuum may be drawn in the furnace for at least a portion of the carbonization. As is well-understood by those in the art, the heat of the furnace causes a chemical conversion which drives off the non-carbon chemical species from the fibrous preform.

Some gas species containing carbon are driven off. For example CO, methane, and HCN are all carbon containing. In embodiments in which fibrous layers 12 are comprised of OPF, the furnace process converts the OPF to carbon fiber by the reorganizing of the PAN fibers and shedding of chemical constituents. The resulting carbonized preform generally has the same fibrous structure as the fibrous preform before carbonizing. However, the OPF have been converted preferably to almost 100% carbon.

After the preform has been carbonized, the fibrous preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases into the furnace and around and through the fibrous preforms. As a result, carbon from the hydrocarbon gases separates from the gases and is deposited on and within the fibrous preforms. In various embodiments in which the fibrous preform comprises carbon fiber, penetration by barbless needles during the needling process may create pores between the carbon fiber in the fibrous preform. Such pores may aid the densification process by better allowing the chemical vapor to infiltrate the fibrous preform during CVI densification. When the densification step is completed, the resulting C/C part has a carbon fiber structure with a carbon matrix infiltrating the fiber structure, thereby deriving the name "carbon/carbon."

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the terms "for example," "for instance," "such as," or "including" are meant to introduce examples that further clarify more general subject matter. Unless otherwise specified, these examples are embodiments of the present disclosure, and are not meant to be limiting in any fashion.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of forming a fibrous preform, comprising:
providing a plurality of needles comprising a plurality of barbed needles and a plurality of barbless needles; and
penetrating the fibrous preform with the plurality of needles, wherein the plurality of needles comprises all needles penetrating the fibrous preform,
wherein the plurality of needles comprises approximately 50% the plurality of barbed needles and approximately 50% the plurality of barbless needles.

2. The method of claim 1, wherein the penetrating the fibrous preform with the plurality of needles comprises penetrating with a barbed needle of the plurality of barbed needles having at least one of a high angle barb or a high barb density.

3. The method of claim 1, wherein the penetrating the fibrous preform with the plurality of needles comprises penetrating with a barbed needle of the plurality of barbed needles having three barbed edges.

4. The method of claim 3, wherein the penetrating the fibrous preform with the plurality of needles comprises penetrating with the barbed needle of the plurality of barbed needles having three barbs on each of the three barbed edges.

5. The method of claim 4, wherein the three barbs on each of the three barbed edges are high angle barbs.

6. The method of claim 1, wherein the penetrating the fibrous preform with the plurality of needles comprises penetrating with a barbless needle of the plurality of barbless needles having a needle tip, the needle tip comprising a tamp surface.

7. The method of claim 1, wherein the penetrating the fibrous preform with the plurality of needles comprises penetrating with a barbless needle of the plurality of barbless needles having a barbless needle length that is shorter than a barbed needle length.

8. The method of claim 1, wherein the penetrating the fibrous preform with the plurality of needles comprises penetrating with a barbed needle of the plurality of barbed needles having at least one of a low angle barb or a low barb density.

9. The method of claim 1, wherein the penetrating the fibrous preform with the plurality of needles comprises penetrating with a barbed needle of the plurality of barbed needles having four barbed sides.

10. The method of claim 9, wherein the barbed needle of the plurality of barbed needles comprises a low angle barb on each of the four barbed sides.

11. The method of claim 1, wherein the plurality of barbed needles comprises a first approximately 50% of each barbed needle having a high barb density and a second approximately 50% of each barbed needle having a low barb density.

12. The method of claim 1, wherein the plurality of barbed needles comprises a first approximately 50% of each barbed needle having a high angle barb and a second approximately 50% of each barbed needle having a low angle barb.

13. A fibrous preform needling system for a fibrous preform having a fibrous layer, comprising:
a drive mechanism;
a needling board coupled to the drive mechanism; and
a plurality of needles configured to penetrate the fibrous preform coupled to the needling board, the plurality of needles comprising a plurality of barbed needles and a plurality of barbless needles, wherein the drive mechanism is configured to cause the needling board to reciprocate, wherein the plurality of needles comprises all needles configured to penetrate the fibrous preform resulting from reciprocation of the needling board, and wherein the plurality of needles comprises approximately 50% the plurality of barbed needles and approximately 50% the plurality of barbless needles.

14. The fibrous preform needling system of claim 13, wherein the plurality of barbed needles comprises a first approximately 50% of each barbed needle having a high barb density and a second approximately 50% of each barbed needle having a low barb density.

15. The fibrous preform needling system of claim 13, wherein a barbless needle of the plurality of barbless needles has a barbless needle length that is shorter than a barbed needle length.

16. The fibrous preform needling system of claim 13, wherein a barbless needle of the plurality of barbless needles comprises a tamp surface.

17. A method of forming a fibrous preform, comprising:
coupling a plurality of barbed needles to a needling board;
coupling a plurality of barbless needles to the needling board, wherein a location of the barbless needles alternate axially and laterally with a location of the barbed needles; and
penetrating the fibrous preform with a plurality of needles comprising the plurality of barbed needles and the plurality of barbless needles, wherein the plurality of needles comprises all needles penetrating the fibrous preform, and
wherein the plurality of needles comprises approximately 50% the plurality of barbed needles and approximately 50% the plurality of barbless needles.

* * * * *